US012190909B2

(12) United States Patent
Galbiati et al.

(10) Patent No.: US 12,190,909 B2
(45) Date of Patent: Jan. 7, 2025

(54) METHOD OF OPERATING AN ELECTRIC MOTOR, CORRESPONDING DEVICE AND HARD DISK DRIVE

(71) Applicant: STMicroelectronics S.r.l., Agrate Brianza (IT)

(72) Inventors: Ezio Galbiati, Agnadello (IT); Maurizio Ricci, Villa di Serio (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/300,806

(22) Filed: Apr. 14, 2023

(65) Prior Publication Data

US 2023/0352050 A1 Nov. 2, 2023

(30) Foreign Application Priority Data

May 2, 2022 (IT) .......................... 102022000008750

(51) Int. Cl.
*G11B 19/20* (2006.01)
(52) U.S. Cl.
CPC ................................ *G11B 19/2072* (2013.01)
(58) Field of Classification Search
None
See application file for complete search history.

(56) References Cited

U.S. PATENT DOCUMENTS

| | | | |
|---|---|---|---|
| 6,160,368 A | 12/2000 | Plutowski | |
| 6,560,056 B1 * | 5/2003 | Ryan | G11B 15/1816 360/71 |
| 6,598,000 B1 * | 7/2003 | Menegoli | G11B 19/28 702/65 |
| 6,972,539 B1 * | 12/2005 | Codilian | G11B 19/28 318/434 |
| 7,948,204 B2 * | 5/2011 | Palma | H02P 6/185 327/108 |
| 8,614,859 B2 | 12/2013 | Galbiati et al. | |
| 9,154,026 B2 * | 10/2015 | Schrom | H02M 1/08 |
| 10,804,822 B2 * | 10/2020 | Alcorn | H02P 6/24 |
| 11,552,633 B1 * | 1/2023 | Cignoli | H03K 17/223 |

(Continued)

FOREIGN PATENT DOCUMENTS

| | | |
|---|---|---|
| DE | 102012101508 A1 | 8/2013 |
| EP | 2665177 A2 | 11/2013 |
| EP | 3429047 A1 | 1/2019 |

*Primary Examiner* — Fred Tzeng
(74) *Attorney, Agent, or Firm* — Slater Matsil, LLP

(57) ABSTRACT

A method includes coupling an electric motor in a hard disk drive to a set of driver circuits. Each driver circuit includes a high-side switch and a low-side switch. The high-side switch has a high-side current flow path between a supply node coupled to a supply voltage and a switching node coupled to a winding of the electric motor. The low-side switch has a low-side current flow path between the switching node and ground. Respective conduction currents are generated through the low-side current flow paths, in response to a command to reduce the motor speed by coupling a drive voltage to the control terminals of the low-side switches. An intensity of at least one of the respective conduction currents is sensed. In response to the sensed current intensity exceeding a current intensity threshold, the control terminals of the low-side switches are coupled to respective ones of the switching nodes.

20 Claims, 8 Drawing Sheets

(56) References Cited

U.S. PATENT DOCUMENTS

| | | | |
|---|---|---|---|
| 11,789,048 B2 * | 10/2023 | Poletto | G01R 19/16547 |
| | | | 324/546 |
| 2009/0243521 A1 * | 10/2009 | Tieu | H02P 3/18 |
| | | | 318/367 |
| 2014/0001987 A1 | 1/2014 | Okada | |
| 2014/0368950 A1 * | 12/2014 | Sumitomo | H02M 3/156 |
| | | | 318/35 |
| 2020/0186144 A1 * | 6/2020 | Balakrishnan | H03K 4/06 |
| 2021/0384852 A1 * | 12/2021 | Occhipinti | H03K 17/6871 |
| 2023/0230616 A1 * | 7/2023 | Johnson | G11B 19/28 |
| | | | 369/53.3 |

\* cited by examiner

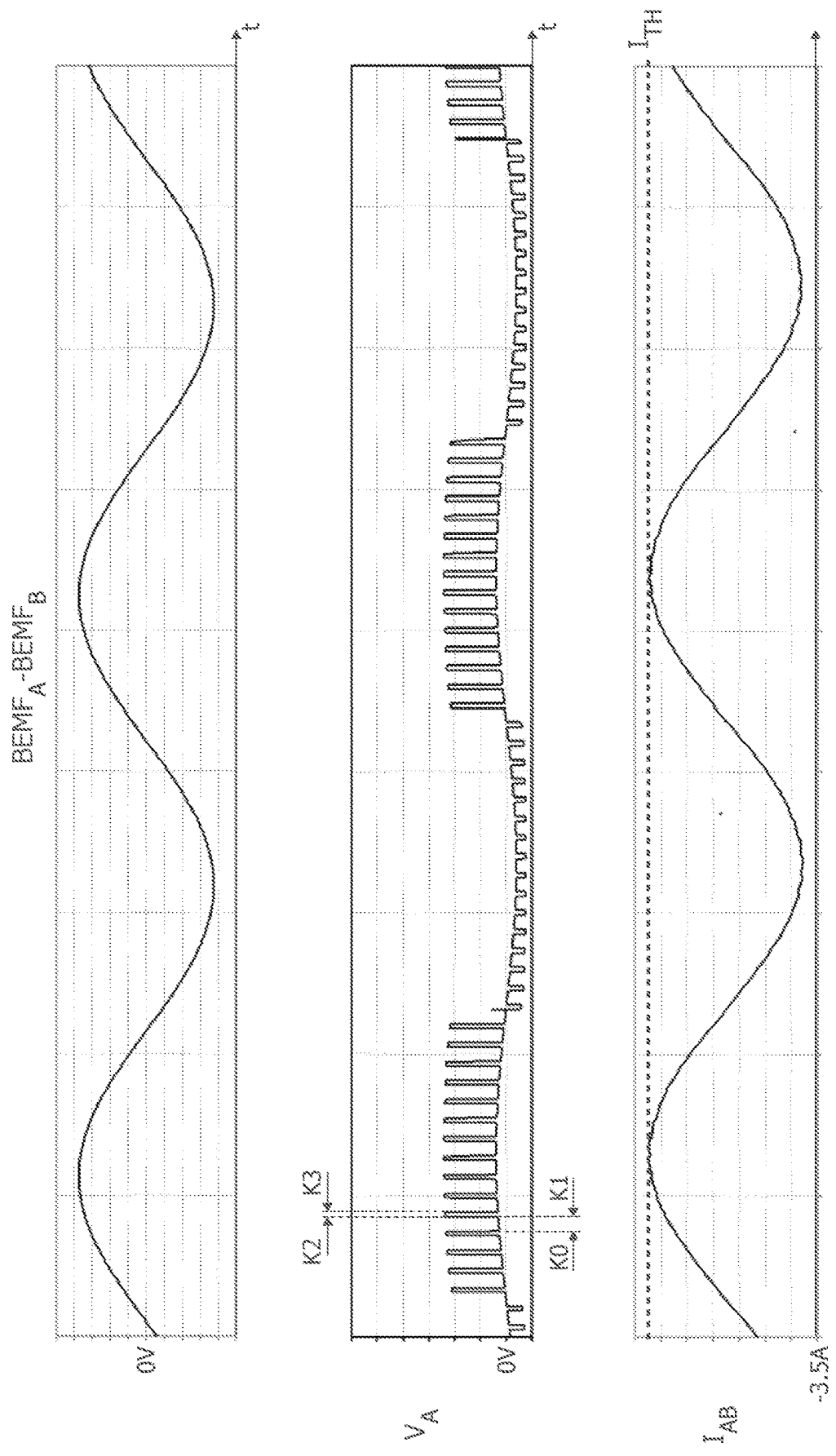

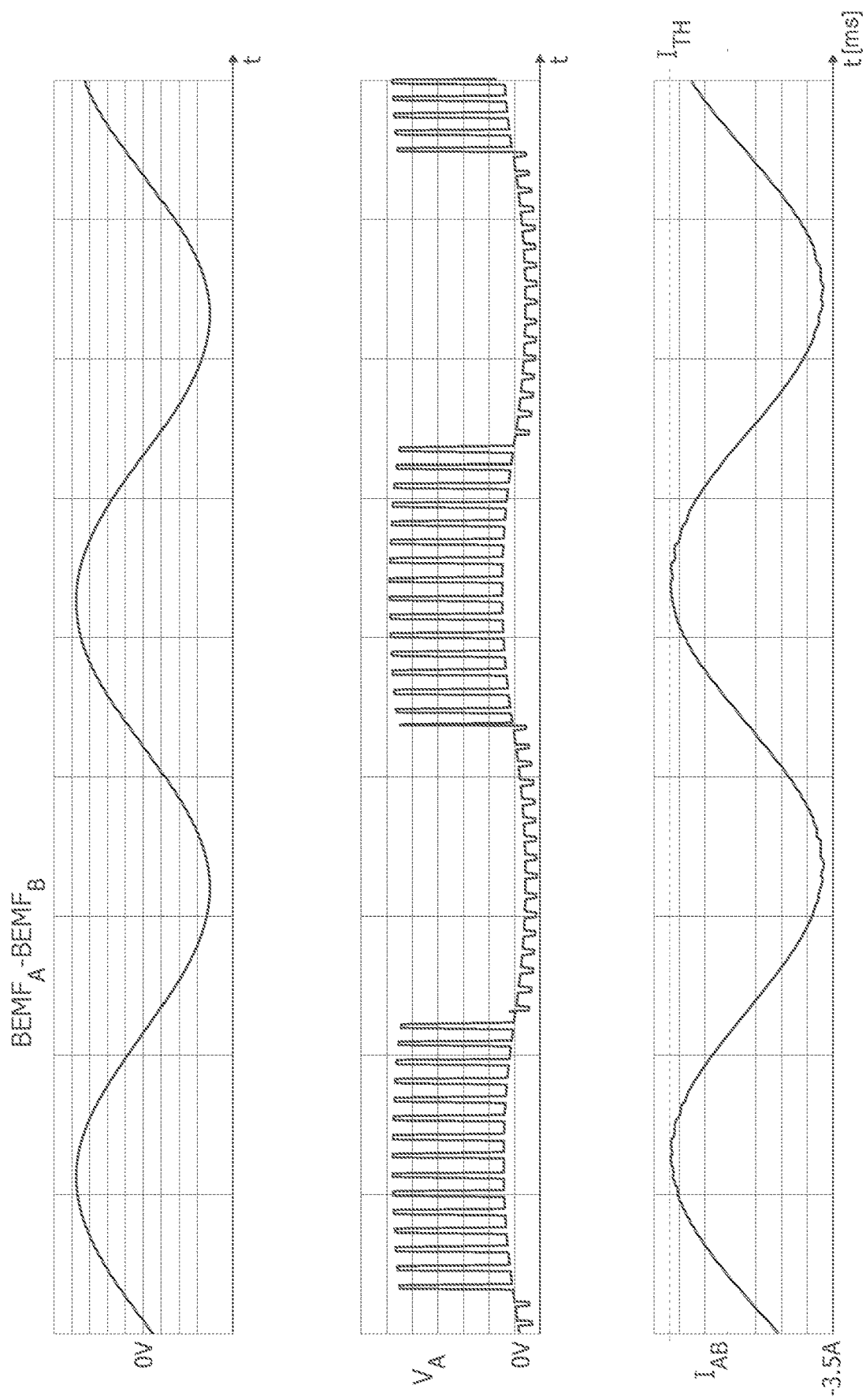

METHOD OF OPERATING AN ELECTRIC MOTOR, CORRESPONDING DEVICE AND HARD DISK DRIVE

CROSS-REFERENCE TO RELATED APPLICATIONS

This application claims priority to Italian Application No. 102022000008750, filed on May 2, 2022, which application is hereby incorporated herein by reference.

TECHNICAL FIELD

The description relates generally to electric motors.

Particular embodiments can be applied, for instance, to hard disk drives used in processing devices such as computers, servers, data centers and the like.

BACKGROUND

Known hard disk drives (HDDs) comprise an electric motor configured to rotate the hard disk itself (currently referred to as "spindle motor") and a voice coil motor configured to move the read/write (briefly, R/W) heads. The designation voice coil motor or VCM is currently used to designate linear motors used to move the heads in hard disk drives.

In the event of an interruption or failure of supply voltage, the motors are configured to stop the spindle motor (e.g., via a spindle brake procedure) after the R/W heads are retracted, reaching a preset rest position.

Braking time, that is the time taken to stop the spindle after power off, and acoustic noise emission during braking are figures of merit of spindle braking.

Document U.S. Pat. No. 8,614,859 B1 discusses a method and circuit to stop a spindle motor in the absence of the external supply voltage in which the spindle motor is structured to move a hard disk provided with at least one reading or writing head moved by a voice coil motor, the spindle motor provided with a plurality of coils. The method includes rectifying the back-electromotive force of the spindle motor to produce a braking current, driving the voice coil motor with at least a portion of the braking current until the speed of the spindle motor becomes lower than a predetermined stop speed, and, after the parking of the at least one reading or writing head of the voice coil motor, stopping the spindle motor by short-circuiting the coils of the spindle motor.

This and other known solutions suffer one or more of the following drawbacks: long waiting time before application of final brake onto the spindle motor, back-electromotive force (briefly, BEMF) generated when R/W heads reach the rest position may exceed safety limits for current amplitude, risking to damage the power stages, increased waiting times in order to facilitate reducing current amplitude within safety ranges, pulsed brake procedures involve a brake efficiency that is a function of the operating duty cycle, pulsed current can easily go in discontinuous mode, increasing acoustic noise production.

SUMMARY

The present disclosure provides one or more embodiments which contribute in overcoming the aforementioned drawbacks.

According to one or more embodiments, a method is provided which at least partially overcomes the drawbacks.

One or more embodiments may relate to a corresponding controller device.

A hard disk drive may be exemplary of a corresponding system equipped with the controller device in at least some embodiments of the present disclosure.

The claims are an integral part of the technical teaching provided herein with reference to the embodiments.

One or more embodiments involve starting a brake procedure as soon as the R/W heads reach the rest position, controlling current amplitude to be within desired values so as to counter triggering discontinuous operation.

One or more embodiments facilitate reducing the braking time of a spindle motor, e.g., improving brake efficiency.

One or more embodiments envisage alternate operation of the spindle power stage between braking and current decay so as to counter quick and uncontrolled discharge of the current.

One or more embodiments facilitate controlling current amplitude and waveform (e.g., sinusoidal). For instance, production of noise sounds is countered thanks to the lack of discontinuity in the waveform.

In at least one embodiment, a method is provided that includes: coupling an electric motor in a hard disk drive to a set of driver circuits. Each driver circuit includes: a high-side switch having a control terminal and a high-side current flow path therethrough, the high-side current flow path extending through the high-side switch between a supply node coupled to a supply voltage and a switching node coupled to a winding of the electric motor, the control terminal being coupled to the switching node, and a low-side switch having a control terminal and a low-side current flow path therethrough, the low-side current flow path extending through the low-side switch between the switching node and ground. Respective conduction currents are generated through the low-side current flow path of each of the low-side switches, in response to a command to reduce the motor speed, by coupling a drive voltage to the control terminals of the low-side switches in the set of driver circuits. An intensity of at least one of the respective conduction currents flowing through the low-side current flow paths of the low-side switches in the set of driver circuits is sensed. In response to the sensed current intensity exceeding a current intensity threshold, the control terminals of the low-side switches in the set of driver circuits are coupled to respective ones of the switching nodes.

In at least one embodiment, a device is provided that includes a set of driver circuits coupled to an electric motor in a hard disk drive. Each driver circuit includes a high-side switch having a control terminal and a high-side current flow path therethrough. The high-side current flow path extends through the high-side switch between a supply node coupled to a supply voltage and a switching node coupled to a winding of the electric motor, and the control terminal is coupled to the switching node. Each driver circuit further includes a low-side switch having a control terminal and a low-side current flow path therethrough. The low-side current flow path extends through the low-side switch between the switching node and ground. Control circuitry is coupled to the set of driver circuits. The control circuitry is configured to: generate respective conduction currents through the low-side current flow path of each of the low-side switches, in response to a command to reduce the motor speed, by coupling a drive voltage to the control terminals of the low-side switches in the set of driver circuits; sense an intensity of at least one of the respective conduction currents flowing through the low-side current flow paths of the low-side switches in the set of driver circuits; and in response to the sensed current intensity exceeding a current intensity threshold, couple the control terminals of the low-side switches in the set of driver circuits to respective ones of the switching nodes.

In at least one embodiment, a hard disk drive is provided that includes an electric motor including a plurality of windings. The electric motor is configured to move at a speed based on an intensity of at least one electric current flowing through the windings. A storage surface is configured to store signals, and the storage surface coupled to the electric motor. A controller is coupled to the electric motor via the windings and configured to drive movement of the storage surface. The controller includes a set of driver circuits coupled to the electric motor. Each driver circuit includes: a high-side switch having a control terminal and a high-side current flow path therethrough, the high-side current flow path extending through the high-side switch between a supply node coupled to a supply voltage and a switching node coupled to a respective winding of the electric motor, the control terminal being coupled to the switching node, and a low-side switch having a control terminal and a low-side current flow path therethrough, the low-side current flow path extending through the low-side switch between the switching node and ground. The controller further includes control circuitry coupled to the set of driver circuits, and the control circuitry is configured to: generate respective conduction currents through the low-side current flow path of each of the low-side switches, in response to a command to reduce the motor speed, by coupling a drive voltage to the control terminals of the low-side switches in the set of driver circuits; sense an intensity of at least one of the respective conduction currents flowing through the low-side current flow paths of the low-side switches in the set of driver circuits; and in response to the sensed current intensity exceeding a current intensity threshold, couple the control terminals of the low-side switches in the set of driver circuits to respective ones of the switching nodes.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is a time diagram exemplary of signals in one or more embodiments, FIG. 6 is a further time diagram exemplary of signals in one or more embodiments.

Corresponding numerals and symbols in the different figures generally refer to corresponding parts unless otherwise indicated.

Figure 1:
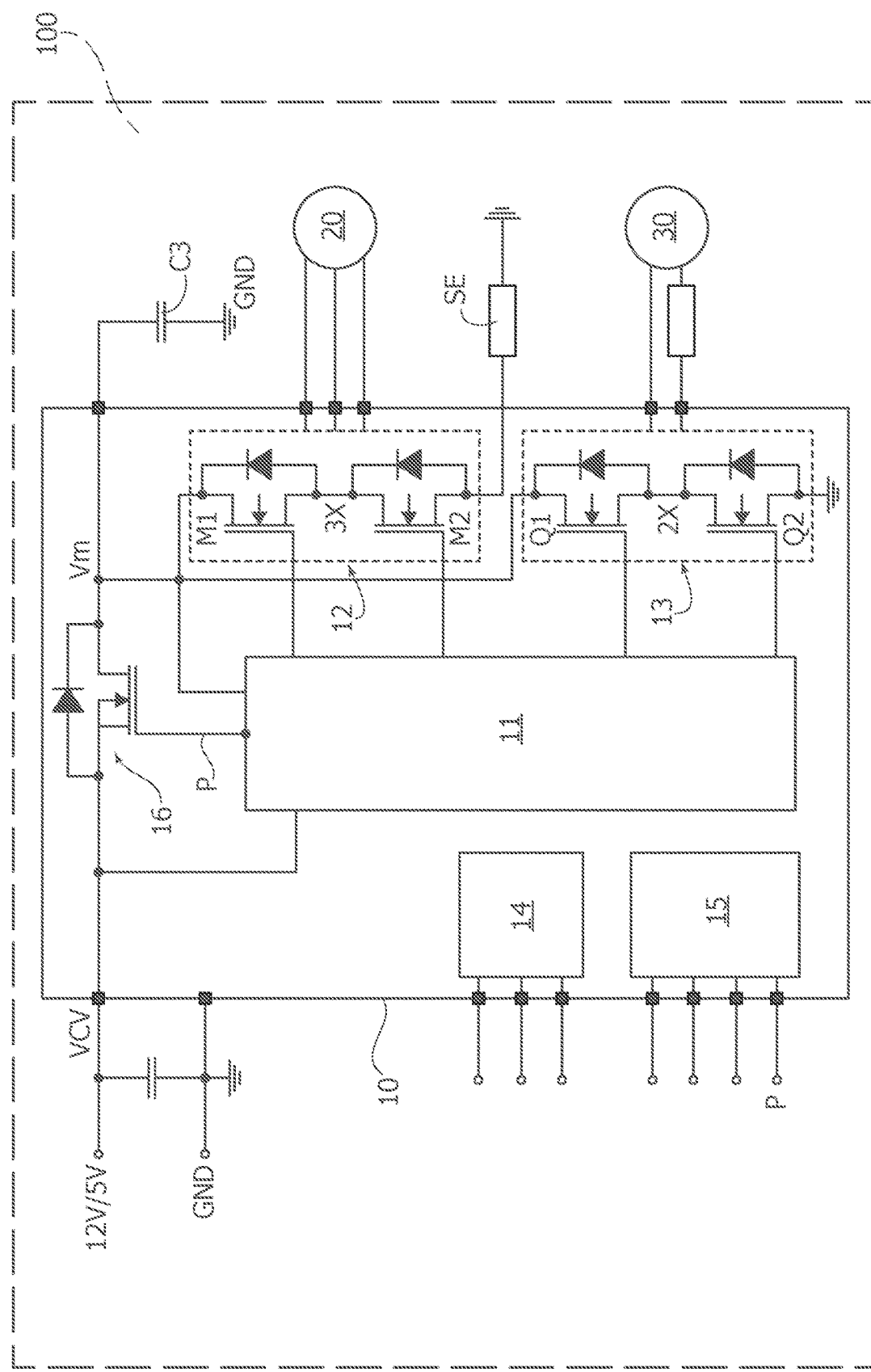
FIG. 1 is a diagram exemplary of a control device of a hard disk drive.

The figures are drawn to clearly illustrate the relevant aspects of the embodiments and are not necessarily drawn to scale.

The edges of features drawn in the figures do not necessarily indicate the termination of the extent of the feature.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

Throughout the figures annexed herein, like parts or elements are indicated with like references/numerals unless the context indicates otherwise, and for brevity a corresponding description will not be repeated for each and every figure.

The references used herein are provided merely for convenience and hence do not define the extent of protection or the scope of the embodiments.

As discussed in the introductory portion of this description, HDD is an acronym for Hard Disk Drive. Also, the designation voice coil motor or VCM is currently used to designate linear motors used to move the heads in hard disk drives.

A hard disk drive is a basic component of various types of processing devices such as personal computers, servers, data centers or the like and is the physical location where information is stored.

As exemplified herein, a controller 10 (e.g., for an electric motor 20 in a hard disk drive 100) comprises a set of driver circuits 12 (e.g., coupled to the electric motor 20 in the hard disk drive 100). For instance, each driver circuit comprises: a high-side switch M1A, M1B, M1C having a control terminal and a high-side current flow path therethrough, the high-side current flow path through the high-side switch between a supply node Vm at a supply voltage and a switching node A, B, C coupled to a winding $L_A$, $L_B$, $L_C$ of the electric motor, a low-side switch M1A, M1B, M1C having a control terminal and a low-side current flow path therethrough, the low-side current flow path through the low-side switch between the switching node and a reference voltage (which, in some embodiments, may be an electrical ground GND), the controller device 10 further comprising control circuitry 11 coupled to said set of driver circuits 12, the control circuitry 11 configured to, in response to a command 220 to reduce the motor speed: couple 232 to a drive voltage V the control nodes of the low-side switches in the set of driver circuits, wherein the low-side current flow paths through the low-side switches are made conductive with respective conduction currents flowing therethrough; sense 234 the intensities $I_{AB}$, $I_{CB}$ of the respective conduction currents flowing through the conductive current flow paths of the low-side switches in the set of driver circuits, and in response to a sum of the sensed intensities $I_{AB}$, $I_{CB}$ exceeding a current intensity threshold $I_{TH}$, couple the control nodes of the low-side switches in the set of driver circuits to respective ones of the switching nodes, with the high-side switches in the set of driver circuits having their control terminals coupled to respective ones of the switching nodes, wherein the speed of the electric motor is reduced.

As exemplified herein, the control circuitry 11 comprises a set of coupling switches $S_A$, $S_B$, $S_C$ coupled to control nodes of said low-side switches, wherein said control circuitry 11 is configured to drive coupling switches in said set of coupling switches to couple said control nodes of the low-side switches in driver circuits of said set of driver circuits, alternatively: to the respective switching nodes, in response to the sum of the sensed current intensities $I_{AB}$, $I_{CB}$ exceeding said current intensity threshold $I_{TH}$, and to the drive voltage V, in response to the sensed current intensity $I_{AB}$, $I_{CB}$ failing to exceed said current intensity threshold $I_{TH}$.

As exemplified herein, the control circuitry 11 is further configured to vary an electric resistance of said current flow paths through the low-side switches in the driver circuits.

As exemplified herein, the control circuitry configured to vary the electric resistance of the current flow paths though the low-side switches in the driver circuits comprises a set of operational amplifiers 50A, 50B, 50C coupled to the set of driver circuits, wherein each operational amplifier in said set of operational amplifiers has a first input node coupled to a selectable voltage level $V_{DS}$, a second input node coupled to a switching node of a respective driver circuit in said set of driver circuits, and an output node coupled to said coupling switches in said set of coupling switches. For instance, the control circuitry 11 is configured to drive coupling switches in said set of coupling switches to couple said control terminal of the low-side switches, alternatively: to the respective switching nodes via said output nodes of said operational amplifiers, in response to the sum of sensed current intensities exceeding the current intensity threshold, and to the drive voltage, in response to the sum of sensed current intensities failing to exceed the current intensity threshold.

As exemplified herein, the control circuitry is configured to: in response to the sum of sensed current intensities exceeding a current intensity threshold, couple 232 the control nodes of the low-side switches in the set of driver circuits to respective ones of the switching nodes for a time interval K2, K3, and couple the control nodes of the low-side switches in the set of driver circuits back to said drive voltage in response to lapse (e.g., an end) of said time interval K2, K3.

As exemplified herein, the predefined time interval is based on a time constant of decay of at least one electric current flowing in the current flow paths of the low-side switches in driver circuits of the set of driver circuits.

As exemplified herein, the control circuitry 11 is configured to: rectify a back-electromotive force, BEMF, produced via the electric motor 20 in the hard disk drive 100, loading a voltage across a capacitive element C3 as a result, and couple said capacitive element C3 to said supply node Vm in driver circuits of said set of driver circuits to provide the supply voltage thereto.

As exemplified herein, a hard disk drive wo comprises: at least one electric motor 20 comprising a plurality of windings $L_A$, $L_B$, $L_C$, the electric motor 20 configured to move at a speed which is as a function of an intensity of at least one electric current $I_{AB}$, $I_{CB}$ flowing through said windings $L_A$, $L_B$, $L_C$;

at least one storage surface configured to store signals therein, the at least one storage surface coupled to the electric motor 20, and a device 10 as exemplified herein. For instance, the device is coupled to the at least one electric motor 20 via the windings thereof to drive movement of the at least one data storage surface coupled to the electric motor 20.

As exemplified herein, a processing device comprises a hard disk drive 100 configured to store signals therein, for instance the hard disk drive as per the present disclosure.

FIG. 1 is a block diagram of a circuit 10 configured to control a spindle motor 20 and a VCM 30 in a hard disk drive HDD.

As exemplified in FIG. 1, a memory storage device 100, such as a hard disk drive (HDD), comprises: a power supply source VCV configured to provide a supply voltage VCV, e.g., in a range between about 5 V (e.g., in case of an HDD mounted on a portable device) to about 12 V (e.g., in case of an HDD equipped on a laptop); a control device 10 (currently referred to also as "power combo") configured to be coupled to the power supply source VCV and to provide it to one or more electric motors of the HDD to drive operation thereof; a spindle motor 20, e.g., a brushless DC electric motor (briefly, BLDC) comprising three stator windings that surround the rotor, the spindle motor 20 configured to be coupled to one or more data storage surfaces or disks of the HDD to drive rotation thereof, and a linear actuator 30, e.g., a VCM, the linear actuator 30 configured to drive movement of the R/W head of the HDD.

As exemplified in FIG. 1, the control device 10 comprises: a supply node VCV configured to be coupled to the external supply voltage VCV, a first power stage 12 configured to be driven via a first drive signal to provide a first driving voltage to the spindle motor 20, a second power stage 13 configured to be driven via a second drive signal to provide a second driving voltage to the actuator 30, and a driver circuit 11 coupled to the first power stage 12 and/or to the second power stage 13 to provide respective first and second drive signals thereto.

For instance, in order to drive the BLDC motor 20, the first power circuit 12 comprises a set of (e.g., three as denoted by 3X in FIG. 1) pairs of switches M1, M2, each pair of switches including a first (e.g., high-side) switch M1 and a second (e.g., low-side) switch M2, wherein each pair of switches M1, M2 is configured to drive a winding of the plurality of windings of the BLDC motor 20.

As exemplified in FIG. 1, the power combo 10 further comprises circuits to implement other functions, such as voltage regulators and power monitor 14, serial port 15 and ISO-Fet 16.

References 14 and 15 in FIG. 1 indicate a serial interface and regulator plus power monitor circuitry.

As discussed so far, the arrangement of FIG. 1 is conventional in the art, which makes it unnecessary to provide a more detailed description herein.

Also, while a single VCM 30 and a single spindle motor 20 is illustrated herein for simplicity, plural VCMs and/or spindle motors may be included in a hard disk drive 100 as illustrated herein.

As exemplified in FIG. 1, for instance: the first power stage 12 includes three (3X) pairs of switching transistors M1, M2 with respective pairs of body diodes connected in parallel with each other between supply voltage Vm and ground GND, the pairs of switching transistors M1, M2 each comprising a respective switching node A, B, C, and the second power stage 13 includes two pairs of switching transistors Q1, Q2 with respective pairs of body diodes connected in parallel with each other between a supply voltage Vm and ground GND, the pairs of body diodes each comprising a respective switching node VCM+, VCM−.

For instance, the spindle motor 20 is coupled to the switching nodes A, B, C of the pairs of transistors M1, M2 whereas the voice coil motor 30 is coupled to the shared terminals VCM+, VCM− of the pairs of transistors Q1, Q2.

As exemplified in FIG. 1, transistors M1, M2 are MOSFET transistors coupled to sensing elements SE configured to sense a current flowing therein, in a manner per se known so that a corresponding description will be omitted for the sake of brevity.

It is noted that, while represented as a separate element for the sake of clarity of the Figure, the sensing element SE may be embedded or integrated in one or more of the transistors (e.g., low-side transistors M2), in a manner per se known to those of skill in the art.

At supply (e.g., 12 V) power off (e.g., emergency power-off), a switch such as isolator field-effect transistor ISO_FET 16 is immediately turned off by the controller 11 so as to isolate a VCV line/node coupled to the power supply from a line Vm intended to provide supply power to the spindle motor 20.

For instance, the regulator 11 supplied by the Vm voltage line has integrated therein a routine (e.g., SW-based) to implement both rectification of the back electromotive force (briefly, BEMF) of the spindle motor 20 and parking of the HDD heads via the VCM 30.

As mentioned, in case the power supply VCV fails, the BEMF voltage of the rotating spindle motor 20 is exploited and rectified to keep the internal supply line Vm (decoupled from supply node VCV via the ISO-Fet 16), as discussed in the following with reference to FIG. 2.

Figure 2:
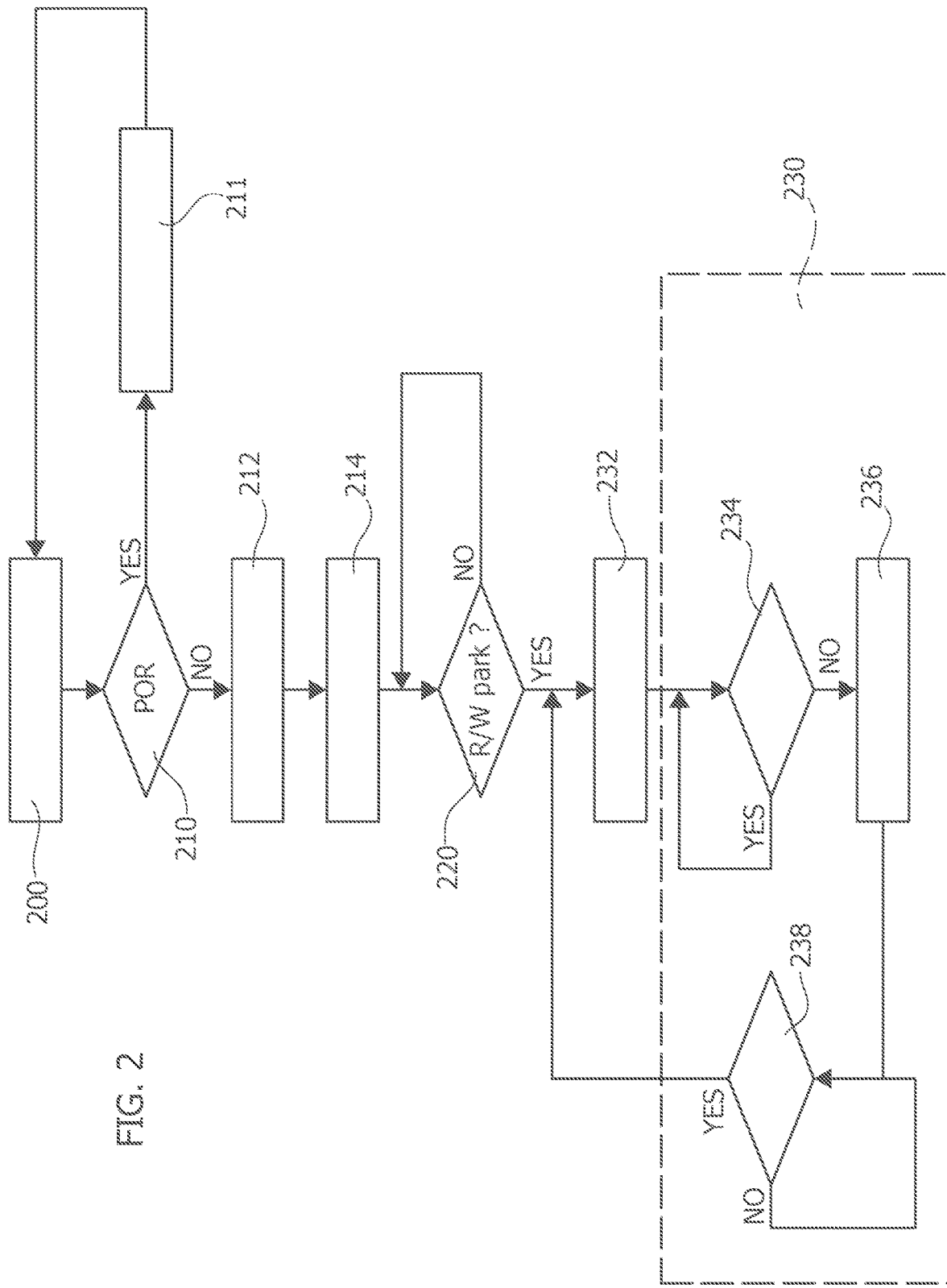
FIG. 2 is a flowchart exemplary of a method in accordance with one or more embodiments.

As exemplified in FIG. 2, a method of operating the power combo 10 comprises: block 200: monitoring (e.g., via internal circuitry of the driver circuit 11, in a manner per se known) the level of the supply voltage VCV provided by the power supply source at the supply node VCV of the power combo 10, block 210: evaluating whether the supply voltage level VCV is above the level adequate to operate the HDD drive 100, for instance by comparing the voltage supply level VCV with a reference level, producing a comparison signal POR having a first value (e.g., "0") or a second value (e.g., "1") based on the voltage supply level VCV exceeding or failing to exceed the reference level, block 211: in case the comparison signal POR is asserted with the first value (e.g., "0") as a result of the comparison in block 210 yielding that the voltage supply level VCV exceeds the reference level, driving (e.g., via the driver circuit 11) "normal" operation of the spindle motor 20 and actuator 30 based on the supply voltage level VCV, in a manner per se known; block 212: in case the comparison signal POR is asserted with the second value (e.g., "1") as a result of the comparison in block 210 yielding that the voltage supply level VCV does not exceed the reference level, turning the ISO-Fet 16 off and triggering (e.g., via the driver circuit 11) a process of rectifying the BEMF from the rotating spindle motor 20 using the internal power line Vm of the power combo 10; as exemplified in FIG. 1, a capacitor C3 coupled to the internal voltage line Vm is used to store the voltage from rectification of the BEMF from the spindle 20; block 214: as soon as a voltage level accumulated in the capacitor C3 via the BEMF rectification reaches a level adequate to drive the actuator 30, retracting (e.g., driving 11 the actuator 30) the R/W heads to their rest or "parking" position; block 220: checking whether the R/W heads have reached their parking position, producing a park command signal in response to a positive check that R/W heads have completed their retreat to the parking position; block 230: in response to the park command signal issued at 220, initiating a braking procedure (e.g., via the driving circuit 11) to reach a full stop of the spindle motor 20.

As exemplified in FIG. 2, the braking procedure 230 triggered in response to the park signal 220, comprises: block 232: applying dynamic braking to the spindle motor 20, block 234: while applying dynamic breaking, monitoring whether the intensity of the sum of currents flowing in the spindle 20 reaches or fails to reach a current intensity threshold, e.g., by comparing the intensity of the total spindle current with an intensity threshold value; block 236: in case the total spindle current intensity reaches the threshold current $I_{TH}$, interrupting application of dynamic brake and applying a "soft" braking instead, e.g., performing a slow current decay as discussed in the following, and block 238: checking whether a condition of ending the soft-braking is reached, e.g., after elapse of a preset time interval or triggering of an enable signal, restarting the dynamic breaking procedure in response to a positive check in which the end condition for soft-braking is reached.

For instance, the pre-set time may be programmable by the user, e.g., as a function of the electrical features of the spindle motor and/or of the desired braking frequency (preferably in an audible sound frequency range).

For instance, the enable signal may be produced (in a manner known per se) with a duty cycle that determines the duration of dynamic phase 232 and soft braking phase 236.

A method as exemplified in FIG. 2, by alternating between "full" dynamic braking and "soft" braking, advantageously counters quick discharge of the current so that current intensity stays within a limited range.

For the sake of simplicity, one or more embodiments are discussed in the following in the exemplary case of a spindle motor comprising a BLDC motor with a wye winding style (known per se), being otherwise understood that such an arrangement is purely exemplary and in no way limiting.

Figure 3A:
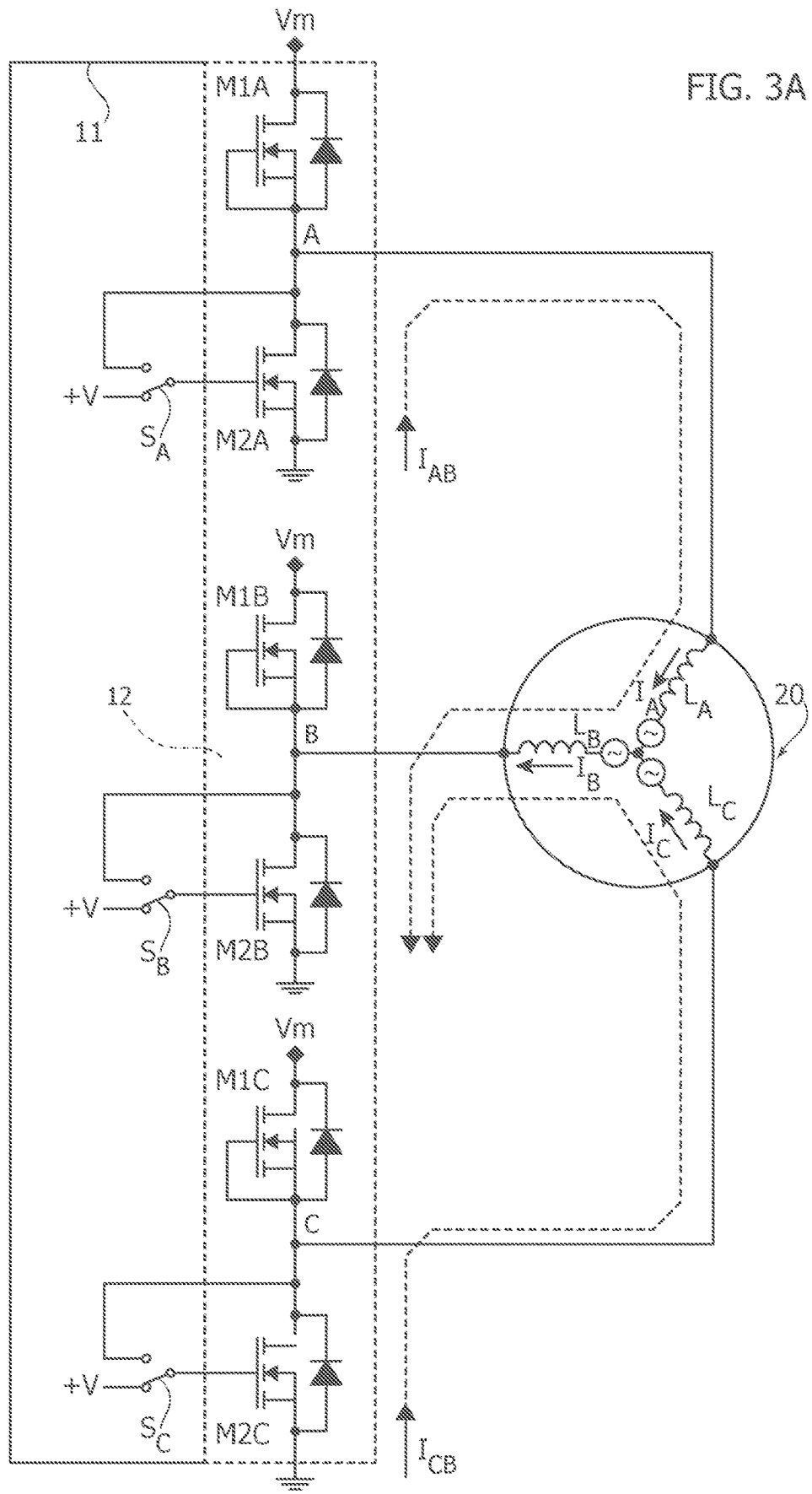
FIGS. 3A and 3B are diagrams exemplary of principles underlying one or more embodiments.
Figure 3B:
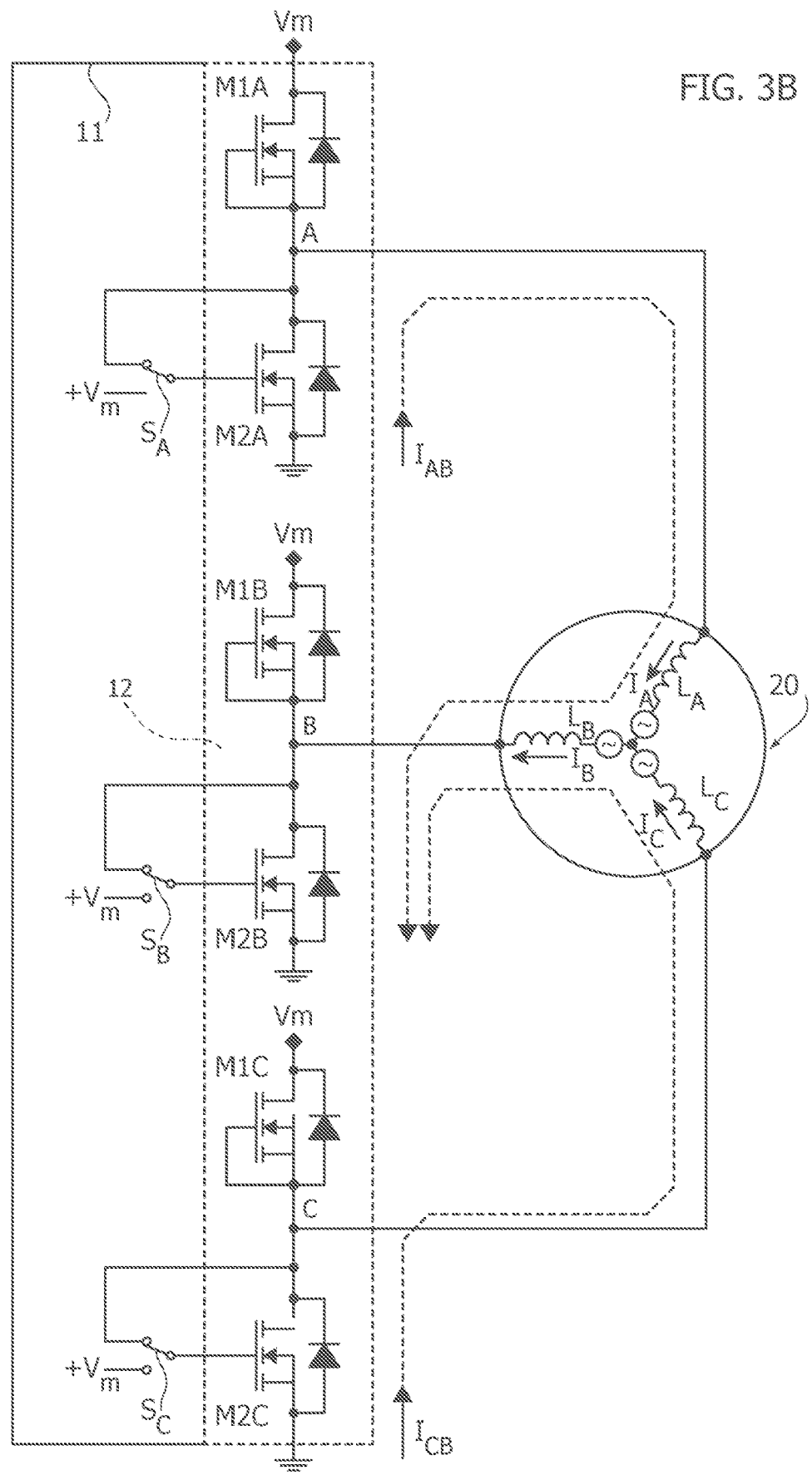

FIGS. 3A and 3B are block diagrams showing the situation at power off, as soon as the head retract procedure is completed (e.g., the procedure being carried on by rectification of the BEMF of the spindle motor). To that effect, the voltages across the windings $L_A$, $L_B$, $L_C$ of the spindle motor 20 are supplied to the first power stage 12, for instance.

FIG. 3A is exemplary of principles of performing the dynamic breaking of the spindle motor 20 at step 232, in response to the park signal at stage 220.

As exemplified in FIG. 3, the set of pairs of transistors in the first power stage 12 comprises: a first pair of switches M1A, M2A comprising a first high-side switch (e.g., MOS transistor) M1A and a first low-side switch (e.g., MOS transistor) M2A, the first high-side M1A and low-side M2A switches being coupled therebetween at a first switching node A therebetween, the first pair of switches M1A, M2A coupled to a first winding $L_A$ of the BLDC motor 20 via the first switching node A; a second pair of switches M1B, M2B comprising a second high-side switch M1B and a second low-side switch M2B, the second high-side M1B and low-side M2B transistors being coupled therebetween at a second switching node B therebetween, the second pair of switches M1B, M2B coupled to a second winding $L_B$ of the BLDC motor 20 via the second switching node B, and a third pair of switches M1C, M2C comprising a third high-side switch M1C and a third low-side switch M2C, the third high-side M1C and low-side M2C switches (e.g., MOSFET transistors) being coupled therebetween at a third switching node C therebetween, the third pair of switches M1C, M2C coupled to a third winding $L_C$ of the BLDC motor 20 via the third switching node C.

As exemplified in FIG. 3A, the low-side switches M2A, M2B, M2C have respective control terminals coupled to respective switches $S_A$, $S_B$, $S_C$ that are configured to be driven to connect the respective control terminals to either one of a control signal V (e.g., provided by the driving circuit 11) or to the respective switching node A, B, C.

For instance, low-side switches M2A, M2B, M2C are MOSFET transistors embedding sensing elements (not visible in FIGS. 3A and 3B) configured to sense a current flowing therein, in a manner per se known.

As exemplified in FIG. 3A, operation of the first power stage 12 comprises, in response to the park command signal issued at stage 220, powering/turning off the high-side transistors M1A, M1B, M1C. For instance, power-off of the high-side transistors M1A, M1B, M1C comprises: driving their respective control terminals to ground, so that their respective current flow paths are made non-conductive, or coupling the control terminals of high-side transistors M1A, M1B, M1C to the switching nodes A, B, C of respective half-bridge arrangements, as exemplified in FIGS. 3A and 3B, applying a zero gate-source voltage at the transistors M1A, M1B, M1C as a result.

FIGS. 3A and 3B are exemplary of operations of the method of braking as per the present disclosure.

As exemplified in FIGS. 3A and 3B, the rotation of the spindle motor 20 produces three back-electromotive forces $BEMF_A$, $BEMF_B$, $BEMF_C$ that force corresponding currents $I_A$, $I_B$, $I_C$ through the motor coils $L_A$, $L_B$, $L_C$. For instance, as the described system is a balanced one, the sum of the currents at every instant is zero.

In a manner per se known to the person skilled in the art, considering a specific electrical phase (e.g., between 120 and 180 electrical degrees), the currents $I_A$ and $I_C$ through the coils $L_A$, $L_C$ is considered "positive" as it is directed towards the motor 20 while the current through the coil $L_B$ is the sum of currents $I_A$, $I_C$ and is considered "negative" as it is directed out of the motor 20.

As exemplified in FIG. 3A, applying dynamic braking in step 232 comprises coupling the respective control terminals of low-side transistors M2A, M2B, M2C to the driving signal V.

As exemplified in FIG. 3A, as a result of dynamic breaking: a first current $I_{AB}$ flows from the first low-side transistor M2A towards the second low-side transistor M2B via the first and second windings $L_A$, $L_B$ of the motor 20, and a second current $I_{CB}$ flows from the third low-side transistor M2C towards the second low-side transistor M2B via the second and third windings $L_B$, $L_C$ of the motor 20, FIG. 4 shows plots over time of various parameters, for instance: in a top portion of the figure, a voltage signal indicative of a BEMF voltage concatenated related to coils $L_A$, $L_B$ of the motor 20; in a bottom portion of the figure, the first current $I_A$ flowing in the spindle motor 20, and in the center portion of the figure, the voltage $V_A$ at the first switching node A.

As exemplified in FIGS. 3A and 3B, during dynamic braking 232 the driver circuit 11 is configured to: turn off high side switches M1A, M1B, M1C, and drive switches $S_A$, $S_B$, $S_C$ to couple respective control terminals of the low-side switches M2A, M2B, M2C to the drive voltage V (operating transistors M2A, M2B, M2C in saturation mode) in a time interval K0-K1 (e.g., about tens of microseconds) in which a sum of the currents $I_{AB}$, $I_{CB}$ first power stage 12, sensed via sensing elements embedded in low-side transistors flowing in the spindle motor 20, reaches a current intensity threshold $I_{TH}$. For instance, when the sum of currents $I_{AB}$, $I_{CB}$ reaches the intensity threshold $I_{TH}$, soft-braking is applied as in step 236.

For instance, the intensity of the total spindle current during or at the end of the dynamic braking is controlled via the sum of the currents $I_{AB}$, $I_{CB}$ detected by the sensing circuitry coupled to each of the low side transistors M2A, M2B, M2C. For instance, in the time interval K0-K3 the controller may vary the duration of the dynamic braking or soft braking as a function of the current intensity detected, e.g., in between alternating dynamic braking and soft braking phases.

As exemplified in FIG. 3A, activating the low-side transistors (for instance, forming the so-called triple half bridge configuration) leads to short-circuiting the coils $L_A$, $L_B$, $L_C$ of the spindle motor 20. This procedure is commonly called "dynamic brake". Thereby, with the spindle motor 20 being short-circuited, the BEMF thereof generates a braking current $I_{AB}$, $I_{CB}$ which is a function of the amplitude of the generated BEMF, and therefore of the instant speed of the motor 20 and the impedance of the windings $L_A$, $L_B$, $L_C$.

As exemplified herein, a method comprises: coupling to an electric motor 20 in a hard disk drive 100 a set of driver circuits 12, each driver circuit comprising: a high-side switch M1A, M1B, M1C having a control terminal and a high-side current flow path therethrough, the high-side current flow path through the high-side switch between a supply node Vm at a supply voltage and a switching node A, B, C coupled to a winding $L_A$, $L_B$, $L_C$ of the electric motor, a low-side switch M1A, M1B, M1C having a control terminal and a low-side current flow path therethrough, the low-side current flow path through the low-side switch between the switching node and ground GND, wherein the method comprises, in response to a command 220 to reduce the motor speed: coupling 232 to a drive voltage V the control nodes of the low-side switches in the set of driver circuits, wherein the low-side current flow paths through the low-side switches are made conductive with respective conduction currents flowing therethrough; sensing 234 the intensities (e.g., $I_{AB}$, $I_{AC}$, $I_{BC}$, $I_{BA}$, $I_{CA}$, $I_{CB}$) of the respective conduction currents flowing through the conductive current flow paths of the low-side switches in the set of driver circuits, and in response to a sum of the sensed current intensities exceeding a current intensity threshold $I_{TH}$, coupling 232 the control nodes of the low-side switches in the set of driver circuits to respective ones of the switching nodes, with the high-side switches in the set of driver circuits having their control terminals coupled to respective ones of the switching nodes, wherein the speed of the electric motor is reduced.

As exemplified herein, coupling the control nodes of the low-side switches in the set of driver circuits to respective ones of the switching nodes comprises varying an electric resistance of said current flow paths through the low-side switches in the driver circuits.

As exemplified herein, varying the electric resistance of said current flow paths though the low-side switches in the driver circuits comprises controlling $V_{DS}$ the voltage drop through the low-side switches in the driver circuits, preferably via voltage $V_{DS}$ applied to the control terminals of the low-side switches in the driver circuits.

As exemplified herein, the method comprises: in response to the sensed current intensity $I_{AB}$, $I_{CB}$, exceeding a current intensity threshold $I_{TH}$, coupling 232 the control nodes of the low-side switches M2A, M2B, M2C in the set of driver circuits to respective ones of the switching nodes for a time interval K2, K3, and coupling the control nodes of the low-side switches in the set of driver circuits back to said drive voltage in response to lapse of the time interval.

As exemplified herein, the method comprises selecting the duration of the time interval K2, K3, based on a time constant of decay of at least one $I_{AB}$, $I_{CB}$ of said respective conduction currents flowing through the conductive current flow paths of the low-side switches in the set of driver circuits.

FIG. 3B is exemplary of the same circuit of FIG. 3A but driven to perform soft braking in place of dynamic braking.

As exemplified in FIG. 3B, applying soft braking in step 236 comprises driving (e.g., via control circuitry 11) the switches $S_A$, $S_B$, $S_C$ to couple respective control terminals of low-sides switches M2A, M2B, M2C to their respective switching nodes A, B, C.

For instance, during the soft braking 236 the currents $I_{AB}$ e $I_{CB}$ maintain a same sign but have a decaying amplitude as they are countered by the drain-source voltage $V_{DS}$ (e.g., equal to the threshold voltage at the control terminal of low side transistors as exemplified in FIGS. 3 and 4).

For instance, when applying soft braking 236, the current $I_{AB}$ flowing in the spindle 20 follows a decaying trend, reducing its intensity as a result. For instance, this is due to the three high side drivers M1A, M1B, M1C being in OFF condition while the three low side drivers M2A, M2B, M2C are in OFF condition but in diode configuration (that is, control terminal in short circuit with the drain terminal).

As exemplified in FIG. 4, at any time instant of the electrical rotation period of the spindle motor 20, a total current flowing is always detectable as the sum of the currents $I_{AB}$, detected in the low side transistors M2A, M2B, M2C.

For the sake of simplicity, in place of explicitly indicating the directional +/− sign of currents flowing in transistors, the anti-phase version of currents $I_{AB}$, $I_{CB}$, $I_{CA}$ are indicated with pedices in reverse order, that is $I_{BA}$, $I_{CB}$, $I_{AC}$. For instance, $I_{AB}=-I_{BA}$, $I_{BC}=-I_{CB}$, $I_{AC}=-I_{CA}$.

As exemplified in FIG. 4, alternating the spindle power stage 12 between the full-brake and the soft-brake produces a current controlled in intensity and with a continuous (notionally, sinusoidal) waveform.

For instance, the stages 232, 236 are alternated with an alternation frequency, preferably above 20 KHz in order to exclude the range of frequencies of audible sound.

For instance, an operative duty cycle between the two stages (dynamic and soft braking) defines an intensity of the current to brake the motor 20.

Figure 5A:
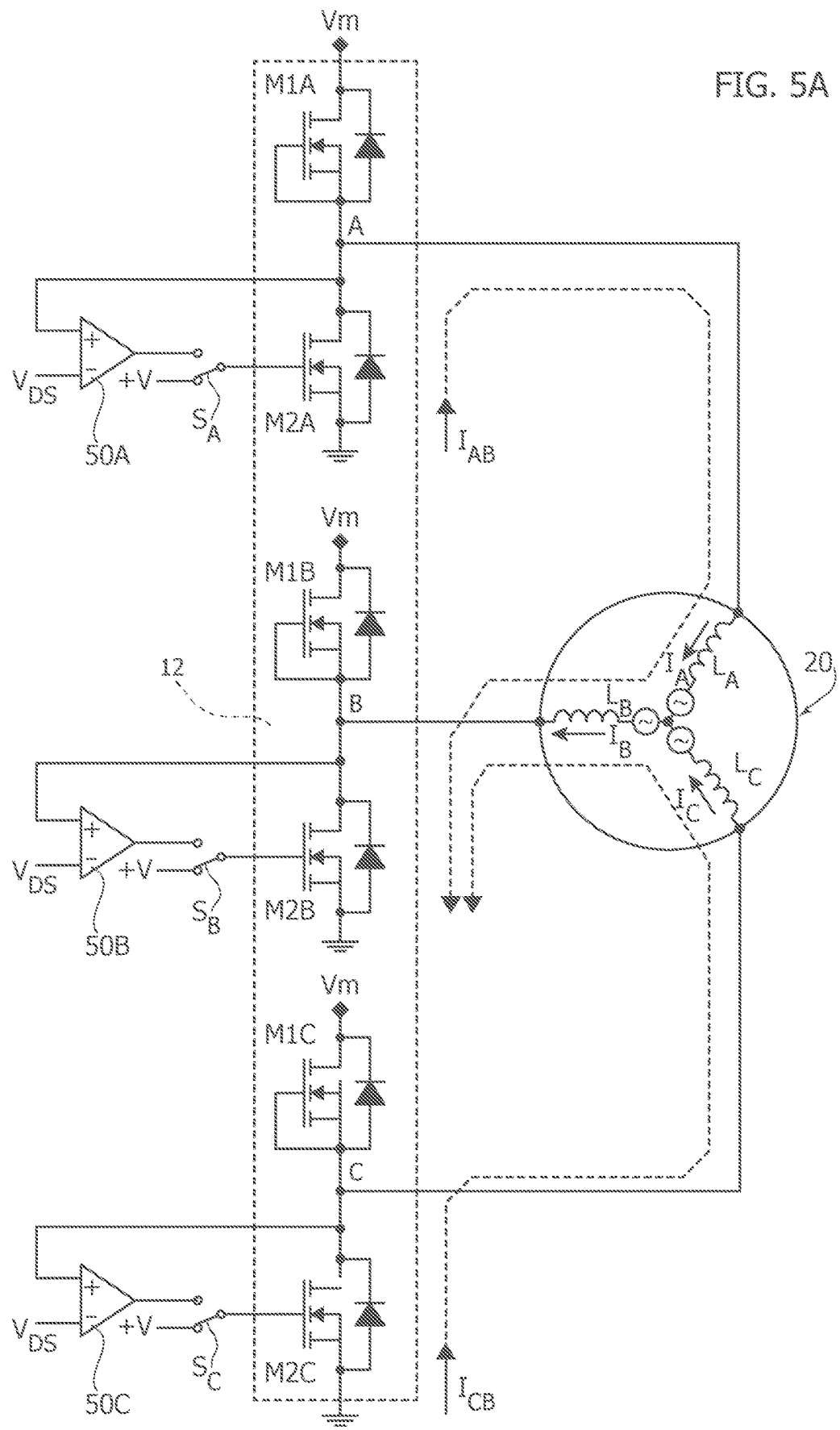
FIGS. 5A and 5B are diagrams exemplary of alternative embodiments.
Figure 5B:
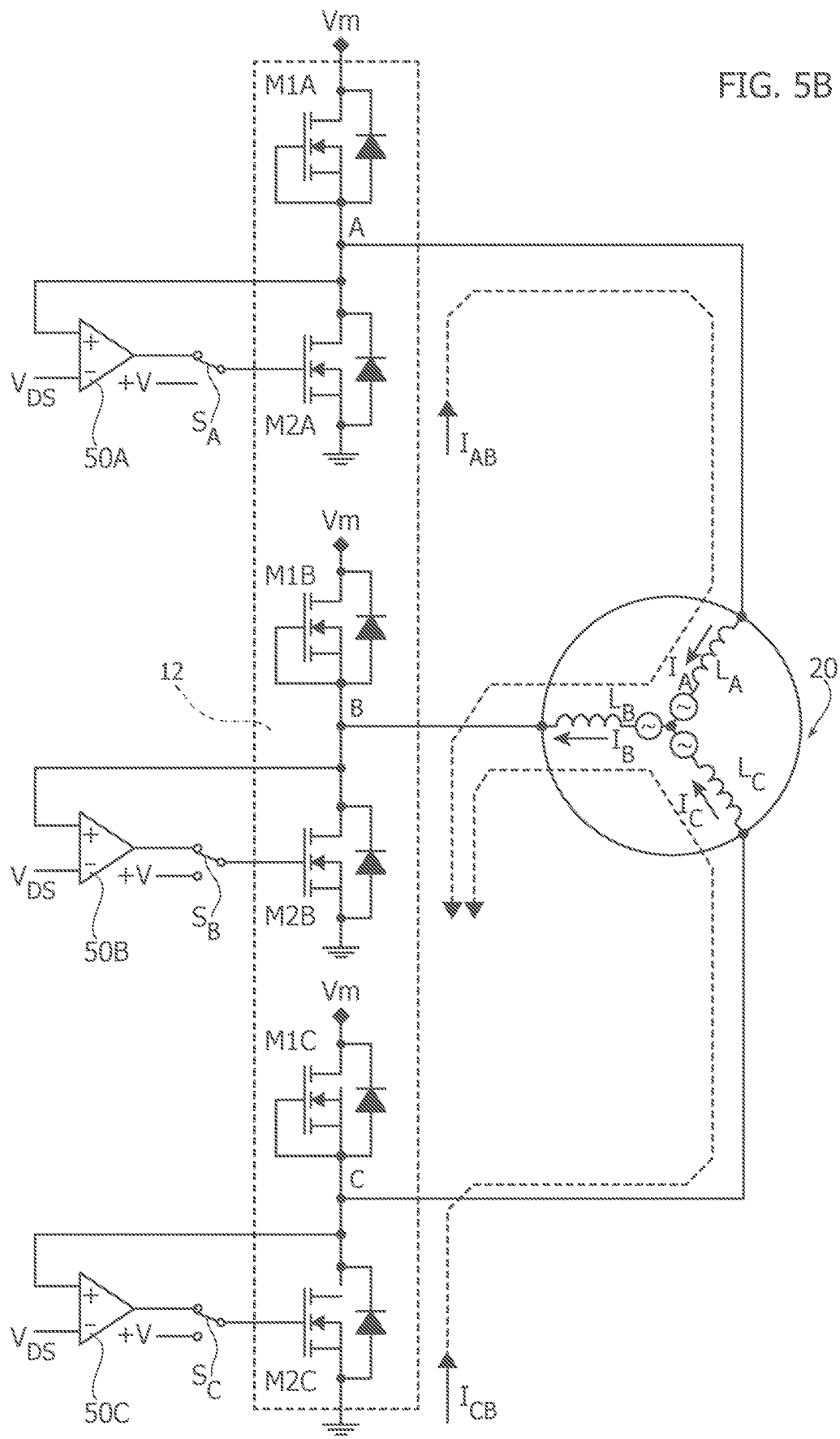

FIGS. 5A and 5B illustrate an alternative implementation of the driving circuit configured to perform the operations of the method as per the present disclosure.

As exemplified in FIGS. 5A and 5B, the alternative arrangement differs from that of FIGS. 3A and 3B by the presence of a set of operational amplifiers 50A, 50B, 50C (e.g., buffers) interposed between the switches $S_A$, $S_B$, $S_C$ and the switching nodes A, B, C.

As exemplified in FIGS. 5A and 5B, the buffers 50A, 50B, 50C may control operative voltages $V_{DS}$ between switching nodes A, B, C and ground.

For instance, an operational amplifier (e.g., 50A) in the set of comparators 50A, 50B, 50C comprises: a first input node configured to receive a drain-source threshold voltage $V_{DS}$, a second input node coupled to the respective switching node (e.g., first switching node A), and an output node coupled to the respective switch (e.g., first switch $S_A$).

As exemplified in FIG. 5B, each switch (e.g., the first switch $S_A$) in the set of switches $S_A$, $S_B$, $S_C$ is controlled to alternatively couple the control node of the respective low-side transistor (e.g., the first transistor M2A) to the control voltage V or to the output node of the respective operational amplifier (e.g., first operational amplifiers 50A for the first switch $S_A$).

As exemplified in FIGS. 5A to 6, the presence of the operational amplifier 50A, 50B, 50C facilitates adjusting impedance of the networks in which the spindle current $I_{AB}$, $I_{CB}$ flow. For instance, varying the drain-source voltage $V_{DS}$ of the low-side transistors M2A, M2B, M2C, facilitates adjusting the impedance thereof and thus adjust the time constant of the decay of the current during the soft-braking phase. For instance, the time constant defines the slope of the current intensity decay during soft braking 236.

For instance, the time decay of the intensity of the current during soft braking varies as a function of the operative voltage $V_{DS}$, (e.g., higher operative voltage leads to a faster reduction of current intensity).

An arrangement as exemplified in FIGS. 5A and 5B facilitates to use the system to various kinds of spindle motor and application scenarios.

As exemplified in FIG. 6, the voltage at the node A reaches higher peaks with respect to the same situation but with respect to FIG. 4. For instance, this is indicative of a different impedance of the circuit network.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the annexed claims.

What is claimed is:

1. A method, comprising:
coupling an electric motor in a hard disk drive to a set of driver circuits, the set of driver circuits comprising high-side switches with high-side control terminals and high-side current flow paths, low-side switches with low-side control terminals and low-side current flow paths, switching nodes coupled to a winding of the electric motor, each driver circuit of the set of driver circuits including:
a high-side switch of the high-side switches having a high-side control terminal of the high-side control terminals and a high-side current flow path of the high-side current flow paths therethrough, the high-side current flow path extending through the high-side switch between a supply node coupled to a supply voltage and a switching node of the switching nodes, the high-side control terminal being coupled to the switching node, and
a low-side switch of the low-side switches having a low-side control terminal of the low-side control terminals and a low-side current flow path of the low-side current flow paths therethrough, the low-side current flow path extending through the low-side switch between the switching node and ground;
generating respective conduction currents through the low-side current flow path of each of the low-side switches, in response to a command to reduce a motor speed of the electric motor, by coupling a drive voltage to the low-side control terminals of the low-side switches in the set of driver circuits;

sensing an intensity of at least one of the respective conduction currents flowing through the low-side current flow paths of the low-side switches in the set of driver circuits; and in response to the sensed current intensity exceeding a current intensity threshold, coupling the control terminals of the low-side switches in the set of driver circuits to respective ones of the switching nodes.

2. The method of claim 1, wherein the coupling the control terminals of the low-side switches in the set of driver circuits to respective ones of the switching nodes comprises varying an electric resistance of the low-side current flow paths through the low-side switches in the set of driver circuits.

3. The method of claim 2, wherein varying the electric resistance of the low-side current flow paths though the low-side switches in the set of driver circuits comprises controlling a voltage drop through the low-side switches in the set of driver circuits.

4. The method of claim 3, wherein the controlling the voltage drop through the low-side switches in the set of driver circuits comprises applying a voltage to the low-side control terminals of the low-side switches in the driver circuits.

5. The method of claim 1, comprising:

in response to the sensed current intensity exceeding the current intensity threshold, coupling the low-side control terminals of the low-side switches in the set of driver circuits to the respective ones of the switching nodes for a time interval, and coupling the control terminals of the low-side switches in the set of driver circuits to the drive voltage in response to an end of the time interval.

6. The method of claim 5, comprising selecting a duration of the time interval based on a time constant of decay of at least one of the respective conduction currents flowing through the low-side current flow paths of the low-side switches in the set of driver circuits.

7. A device, comprising:

a set of driver circuits coupled to an electric motor in a hard disk drive, the set of driver circuits comprising high-side switches with high-side control terminals and high-side current flow paths, low-side switches with low-side control terminals and low-side current flow paths, switching nodes coupled to a winding of the electric motor, each driver circuit of the set of driver circuits comprising:

a high-side switch of the high-side switches having a high-side control terminal of the high-side control terminals and a high-side current flow path of the high-side current flow paths therethrough, the high-side current flow path extending through the high-side switch between a supply node coupled to a supply voltage and a switching node of the switching nodes, high-side the control terminal being coupled to the switching node, and a low-side switch of the low-side switches having a low-side control terminal of the low-side control terminals and a low-side current flow path of the low-side current flow paths therethrough, the low-side current flow path extending through the low-side switch between the switching node and ground;

control circuitry coupled to the set of driver circuits, the control circuitry configured to:

generate respective conduction currents through the low-side current flow path of each of the low-side switches, in response to a command to reduce a motor speed of the electric motor, by coupling a drive voltage to the low-side control terminals of the low-side switches in the set of driver circuits;

sense an intensity of at least one of the respective conduction currents flowing through the low-side current flow paths of the low-side switches in the set of driver circuits; and in response to the sensed current intensity exceeding a current intensity threshold, couple the control terminals of the low-side switches in the set of driver circuits to respective ones of the switching nodes.

8. The device of claim 7, wherein the control circuitry comprises a set of coupling switches coupled to the low-side control terminals of the low-side switches, wherein the control circuitry is configured to drive the coupling switches in the set of coupling switches to couple the low-side control terminals of the low-side switches in the set of driver circuits to the respective switching nodes, in response to a sum of sensed current intensities exceeding the current intensity threshold.

9. The device of claim 8, wherein the control circuitry is configured to drive the coupling switches in the set of coupling switches to couple the low-side control terminals of the low-side switches in the set of driver circuits to the drive voltage, in response to the sensed current intensity failing to exceed the current intensity threshold.

10. The device of claim 9, wherein the control circuitry is further configured to vary an electric resistance of the low-side current flow paths through the low-side switches in set of the driver circuits.

11. The device of claim 10, wherein the control circuitry comprises a set of operational amplifiers coupled to the set of driver circuits, wherein each operational amplifier in the set of operational amplifiers has a first input node coupled to a selectable voltage level, a second input node coupled to the switching node of a respective driver circuit in the set of driver circuits, and an output node coupled to the coupling switches in the set of coupling switches, wherein the control circuitry is configured to drive the coupling switches in the set of coupling switches to couple the low-side control terminals of the low-side switches to the respective switching nodes via the output nodes of the operational amplifiers, in response to the sum of sensed current intensities exceeding the current intensity threshold.

12. The device of claim 11, wherein the control circuitry is configured to drive the coupling switches in the set of coupling switches to couple the low-side control terminals of the low-side switches to the drive voltage, in response to the sum of sensed current intensities failing to exceed the current intensity threshold.

13. The device of claim 7, wherein the control circuitry is configured to:

in response to a sum of sensed current intensities exceeding the current intensity threshold, couple the low-side control terminals of the low-side switches in the set of driver circuits to respective ones of the switching nodes for a time interval, and couple the low-side control terminals of the low-side switches in the set of driver circuits to the drive voltage in response to an end of the time interval.

14. The device of claim 13, wherein the time interval is based on a time constant of decay of at least one of the respective conduction currents flowing through the low-side current flow paths of the low-side switches in the driver circuits of the set of driver circuits.

15. The device of claim 7, wherein the control circuitry is configured to:
rectify a back-electromotive force produced via the electric motor in the hard disk drive, and load a voltage across a capacitive element as a result, and
couple the capacitive element to the supply node in the driver circuits of the set of driver circuits.

16. A hard disk drive, comprising:
an electric motor including a plurality of windings, the electric motor configured to move at a speed based on an intensity of at least one electric current flowing through the windings;
a storage surface configured to store signals, the storage surface coupled to the electric motor; and
a controller coupled to the electric motor via the windings and configured to drive movement of the storage surface, the controller comprising:
a set of driver circuits coupled to the electric motor, the set of driver circuits comprising high-side switches with high-side control terminals and high-side current flow paths, low-side switches with low-side control terminals and low-side current flow paths, switching nodes coupled to a winding of the electric motor, each driver circuit of the set of driver circuits including:
a high-side switch of the high-side switches having a high-side control terminal of the high-side control terminals and a high-side current flow path of the high-side current flow paths therethrough, the high-side current flow path extending through the high-side switch between a supply node coupled to a supply voltage and a switching node of the switching nodes, the high-side control terminal being coupled to the switching node, and
a low-side switch of the low-side switches having a low-side control terminal of the low-side control terminals and a low-side current flow path of the low-side current flow paths therethrough, the low-side current flow path extending through the low-side switch between the switching node and ground;
control circuitry coupled to the set of driver circuits, the control circuitry configured to:
generate respective conduction currents through the low-side current flow path of each of the low-side switches, in response to a command to reduce the speed of the electric motor, by coupling a drive voltage to the low-side control terminals of the low-side switches in the set of driver circuits;
sense an intensity of at least one of the respective conduction currents flowing through the low-side current flow paths of the low-side switches in the set of driver circuits; and
in response to the sensed current intensity exceeding a current intensity threshold, couple the control terminals of the low-side switches in the set of driver circuits to respective ones of the switching nodes.

17. The hard disk drive of claim 16, wherein the control circuitry comprises a set of coupling switches coupled to the low-side control terminals of the low-side switches, wherein the control circuitry is configured to drive the coupling switches in the set of coupling switches to couple the low-side control terminals of the low-side switches in the set of driver circuits to the respective switching nodes, in response to a sum of sensed current intensities exceeding the current intensity threshold.

18. The hard disk drive of claim 17, wherein the control circuitry is configured to drive the coupling switches in the set of coupling switches to couple the low-side control terminals of the low-side switches in the set of driver circuits to the drive voltage, in response to the sensed current intensity failing to exceed the current intensity threshold.

19. The hard disk drive of claim 18, wherein the control circuitry is further configured to vary an electric resistance of the low-side current flow paths through the low-side switches in set of the driver circuits.

20. The hard disk drive of claim 19, wherein the control circuitry comprises a set of operational amplifiers coupled to the set of driver circuits, wherein each operational amplifier in the set of operational amplifiers has a first input node coupled to a selectable voltage level, a second input node coupled to the switching node of a respective driver circuit in the set of driver circuits, and an output node coupled to the coupling switches in the set of coupling switches,
wherein the control circuitry is configured to:
drive the coupling switches in the set of coupling switches to couple the low-side control terminals of the low-side switches to the respective switching nodes via the output nodes of the operational amplifiers, in response to the sum of sensed current intensities exceeding the current intensity threshold, and
drive the coupling switches in the set of coupling switches to couple the low-side control terminals of the low-side switches to the drive voltage, in response to the sum of sensed current intensities failing to exceed the current intensity threshold.

* * * * *